US007710963B1

(12) United States Patent
Jain et al.

(10) Patent No.: US 7,710,963 B1
(45) Date of Patent: May 4, 2010

(54) BINARY TREES FOR MULTICAST TRAFFIC

(75) Inventors: Amit Jain, Santa Clara, CA (US); Yong Luo, Santa Clara, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 373 days.

(21) Appl. No.: 11/696,929

(22) Filed: Apr. 5, 2007

(51) Int. Cl.
*H04L 12/28* (2006.01)
*H04L 12/56* (2006.01)

(52) U.S. Cl. .................. 370/390; 370/432; 370/351
(58) Field of Classification Search .......... 370/390, 370/351, 352, 353, 401, 432
See application file for complete search history.

(56) References Cited

U.S. PATENT DOCUMENTS

| | | | | |
|---|---|---|---|---|
| 5,402,415 A * | 3/1995 | Turner | | 370/390 |
| 7,263,099 B1 * | 8/2007 | Woo et al. | | 370/390 |
| 7,266,120 B2 * | 9/2007 | Cheng et al. | | 370/390 |
| 7,289,503 B1 * | 10/2007 | Sindhu et al. | | 370/392 |
| 7,420,972 B1 * | 9/2008 | Woo et al. | | 370/390 |
| 7,519,054 B2 * | 4/2009 | Varma | | 370/388 |
| 2006/0114903 A1 * | 6/2006 | Duffy et al. | | 370/390 |
| 2006/0215698 A1 * | 9/2006 | Hamdan | | 370/471 |

* cited by examiner

*Primary Examiner*—Ayaz R Sheikh
*Assistant Examiner*—Chuong T Ho
(74) *Attorney, Agent, or Firm*—Harrity & Harrity, LLP

(57) ABSTRACT

A network device may include an input device and a packet forwarding engine. The input device receives a data packet. The packet forwarding engine includes logic configured to determine that the data packet is to be multicast. The logic is also configured to identify one of multiple forwarding schemes, where each of the forwarding schemes is configured such that the packet forwarding engine generates and forwards no more than two copies of the data packet.

19 Claims, 6 Drawing Sheets

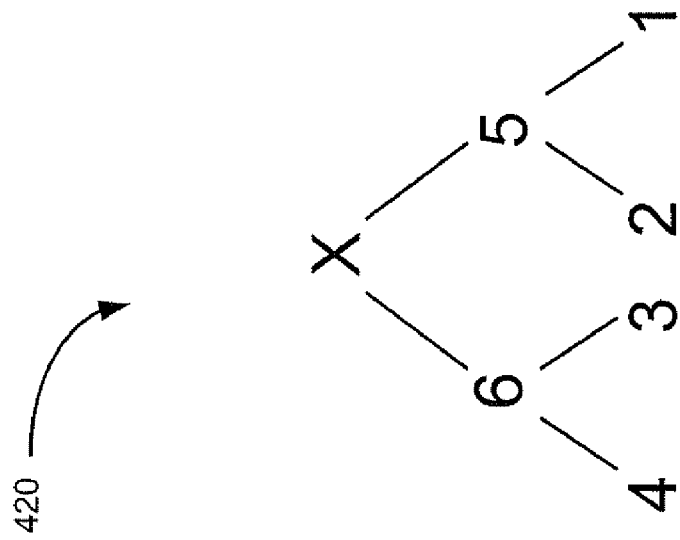
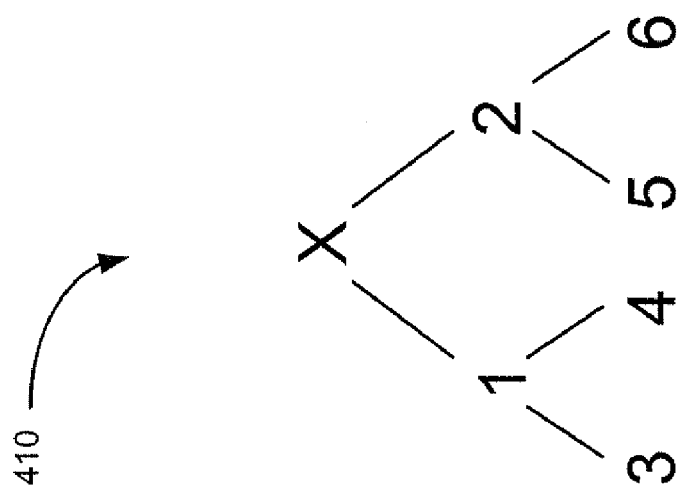
FIG. 4

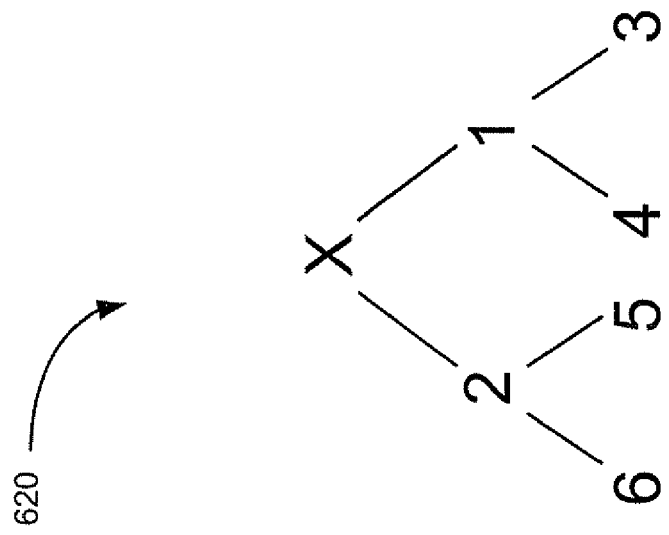
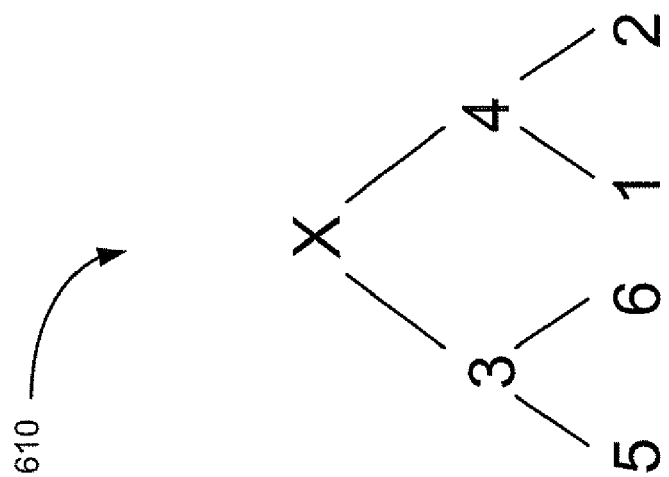
FIG. 6

BINARY TREES FOR MULTICAST TRAFFIC

BACKGROUND OF THE INVENTION

1. Field of the Invention

Implementations described herein relate generally to network communications and, more particularly, to processing multicast traffic.

2. Description of Related Art

Conventional network devices, such as routers, transfer packets through a network from a source to a destination. Typically, the router performs a lookup using information in the header of the packet, identifies a destination and forwards the packet to the destination. In some cases, an incoming data packet is forwarded to a number of destinations. For example, the data packet may be a multicast packet intended for a number of different destinations.

In this case, the router must replicate the data packet and forward copies of the replicated data packet to a number of output devices or interfaces associated with the multiple destinations. One problem associated with multicast traffic is that the data replication is time consuming and takes considerable processing resources. For example, in conventional systems, a single ingress forwarding device may need to replicate each packet a large number of times, such as four or more, to forward the data packet to the appropriate output devices/interfaces. Another problem occurs in cases where the single ingress forwarding device interfaces with a switch fabric to forward the replicated packets to the output forwarding devices/interfaces. In these cases, the bandwidth to the switch fabric may be limited. Therefore, conventional systems for processing multicast data may significantly slow data throughput on the router and increase congestion on the router. In addition, in some cases, the router must drop packets in order to maintain the desired line rate and avoid other congestion related problems.

SUMMARY OF THE INVENTION

According to one aspect, a network device is provided. The network device includes a switch fabric and a plurality of packet forwarding devices connected via the switch fabric. Each of the packet forwarding devices includes logic configured to receive a first data packet, determine that the first data packet is to be forwarded to more than one of the plurality of packet forwarding devices and identify one of a plurality of binary forwarding schemes, where each of the plurality of binary forwarding schemes represents the plurality of packet forwarding devices to which the first data packet is to be forwarded as nodes in a tree. The nodes include a root node, branch nodes and at least one leaf node, where an ingress packet forwarding device that received the first data packet corresponds to the root node. The logic is also configured to replicate the first data packet in accordance with the identified binary forwarding scheme to form copies of the first data packet and forward the copies of the first data packet to the switch fabric.

According to another aspect, a method for processing multicast data in a network device that includes a plurality of packet forwarding engines connected via a switch fabric is provided. The method includes receiving a data packet at a first one of the packet forwarding engines, determining that the data packet is to be multicast and identifying a first one of a plurality of forwarding schemes. The method also includes copying, based on the first forwarding scheme, the data packet for forwarding to other ones of the packet forwarding engines via the switch fabric. The method further includes forwarding copies of the data packet to the switch fabric, where none of the packet forwarding engines forwards more than two copies of the data packet to the switch fabric.

In a further aspect, a network device includes an input device and a first packet forwarding engine. The input device is configured to receive a data packet. The first packet forwarding engine includes logic configured to determine that the data packet is to be multicast and identify a first one of a plurality of forwarding schemes, where each of the plurality of forwarding schemes is configured such that the first packet forwarding engine generates and forwards no more than two copies of the data packet. The logic is also configured to generate at least one copy of the data packet in accordance with the first forwarding scheme and forward the at least one copy of the data packet.

BRIEF DESCRIPTION OF THE DRAWINGS

The accompanying drawings, which are incorporated in and constitute a part of this specification, illustrate an embodiment of the invention and, together with the description, explain the invention. In the drawings.

FIG. 4 illustrates instances of two binary trees used by the processing logic of FIG. 3 for processing multicast traffic;

FIG. 6 illustrates instances of two alternative binary trees which may also be used by the processing logic of FIG. 3 for processing multicast traffic.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

Figure 1:
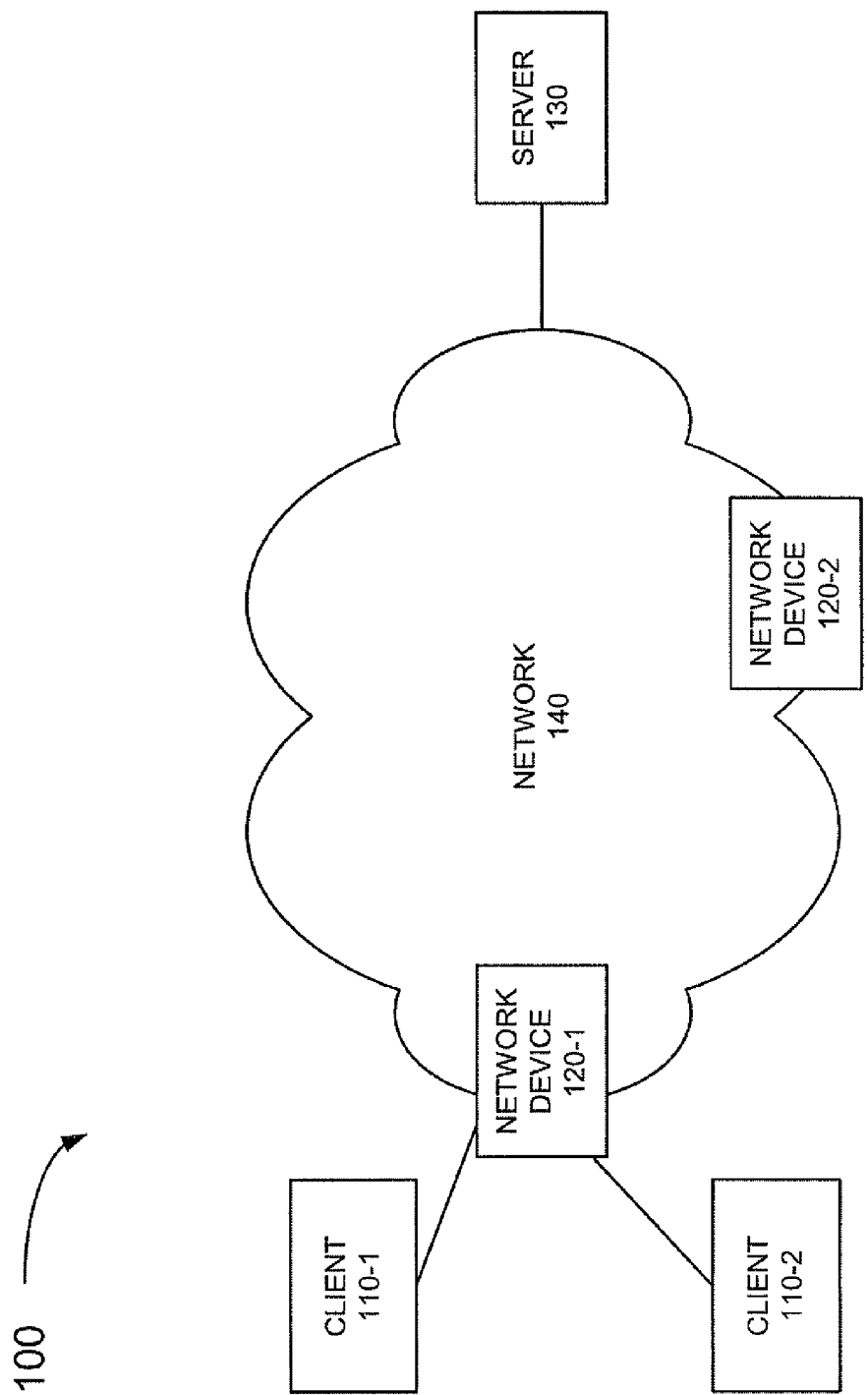
FIG. 1 is a diagram of an exemplary network in which systems and methods described herein may be implemented.

FIG. 1 is a diagram of an exemplary network 100 in which systems and methods described herein may be implemented. Network 100 may include clients 110-1 and 110-2 (referred to herein collectively as clients 110), network devices 120-1 and 120-2 (referred to collectively as network devices 120), server 130 and network 140. The exemplary configuration illustrated in FIG. 1 is provided for simplicity. It should be understood that a typical network may include more or fewer devices than illustrated in FIG. 1. In addition, other devices that facilitate communications between the various entities illustrated in FIG. 1 may also be included in network 100.

Clients 110 may each include a device, such as a personal computer, a laptop computer, a personal digital assistant (PDA), a web-based appliance, a wireless telephone or another type of computation or communication device, or a processing running on one of these devices. Client 110 may communicate with network devices 120 and server 130 over network 140 via wired, wireless or optical connections.

Network devices 120 may each include a router, a switch, or another device that receives data and forwards the data toward its intended destination. Network devices 120 may forward unicast data and multicast data to other devices in network 100, such as other network devices 120, server 130 and clients 110. The term "multicast data" as used herein refers to data forwarded from a single ingress device to multiple output devices, such as broadcast data, point-to-multipoint (P2MP) data, data that is flooded to all output devices/interfaces on a particular receiving device, or any other data that is forwarded to multiple output devices/interfaces. In an exemplary implementation, network devices 120 may forward multicast data using a binary tree that distributes processing associated with replicating data packets and forwarding the replicated packets to their destinations, as described in detail below.

Server 130 may include a server/computing device, or a set of servers/computing devices, that provides clients 110 with access to various resources in network 100. In some implementations, the network resources reside on server 130. In other implementations, the network resources may be located externally with respect to server 130 (not shown in FIG. 1).

Network 140 may include one or more networks, such as a local area network (LAN) or a private network, such as a company network or intranet. Network 140 may also include a wide area network (WAN), a metropolitan area network (MAN), a telephone network, such as the Public Switched Telephone Network (PSTN), the Internet, a cellular network, a satellite network, another type of network or a combination of networks.

Exemplary Network Device Configuration

Figure 2:
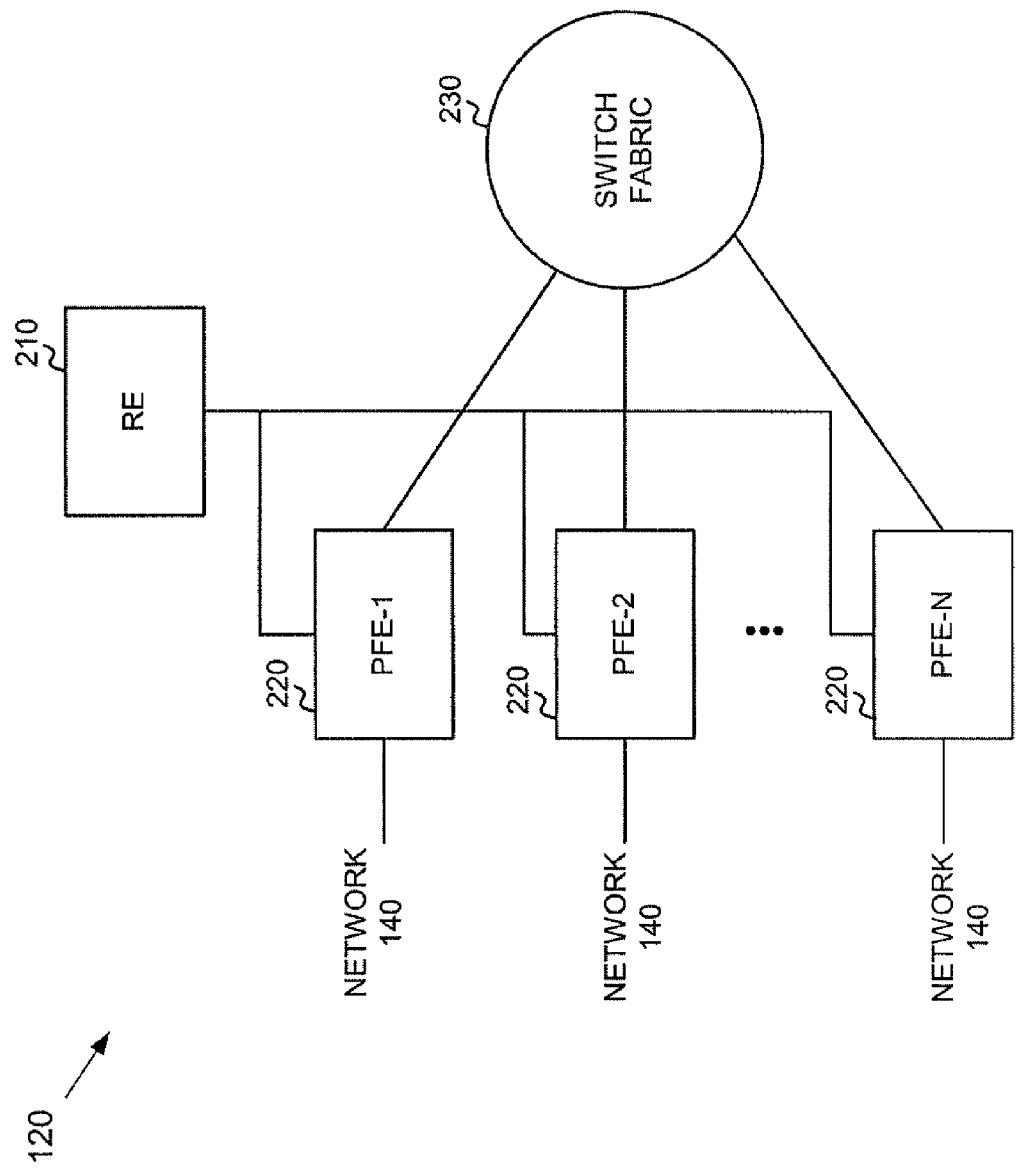
FIG. 2 is a block diagram illustrating an exemplary configuration of the network device of FIG. 1.

FIG. 2 is a block diagram illustrating an exemplary configuration of network device 120-1 (referred to as network device 120) of FIG. 1. Network device 120-2 may be configured in a similar manner. In this particular implementation, network device 120 may be a router. Network device 120 may receive one or more packet streams via network 140, process the stream(s) to determine destination information, and transmit the stream(s) on one or more links based on the destination information.

Referring to FIG. 2, network device 120 may include routing engine (RE) 210 and multiple packet forwarding engines (PFEs) 220, labeled PFE-1 through PFE-N, interconnected via switch fabric 230. Switch fabric 230 may include one or more switching planes to facilitate communication between two or more of PFEs 220.

RE 210 may include processing logic that performs high-level management functions for network device 120. For example, RE 210 may communicate with other networks and systems connected to network device 120 to exchange information regarding network topology. RE 210 may create routing tables based on network topology information, create forwarding tables based on the routing tables and send the forwarding tables to PFEs 220. PFEs 220 use the forwarding tables to perform route lookup for incoming packets. RE 210 also performs other general control and monitoring functions for network device 120.

Each of PFEs 220 connects to RE 210 and switch fabric 230. PFEs 220 receive packets via network 140. The packets may be received via any number of physical links or transport media, such as optical fiber or Ethernet cable. The packets may also be received over an air/free space medium. The packets may also be formatted according to any number of protocols, such as the synchronous optical network (SONET) standard or Ethernet.

When a packet is received by one of PFEs 220, the PFE 220 may determine whether the data is a unicast or multicast packet. When the packet is a multicast packet, PFE 220 may replicate the packet and forward the replicated packet to one or more other PFEs 220. In this case, the receiving or ingress PFE 220 may forward the replicated packets to switch fabric 230, which then forwards the replicated packets to the appropriate PFEs 220. In an exemplary implementation, each PFE 220 may use a binary replicating scheme in which no PFE 220 will replicate a data packet more than two times, as described in detail below. This enables the replication process to be performed in an efficient manner while also minimizing congestion on network device 120.

Figure 3:
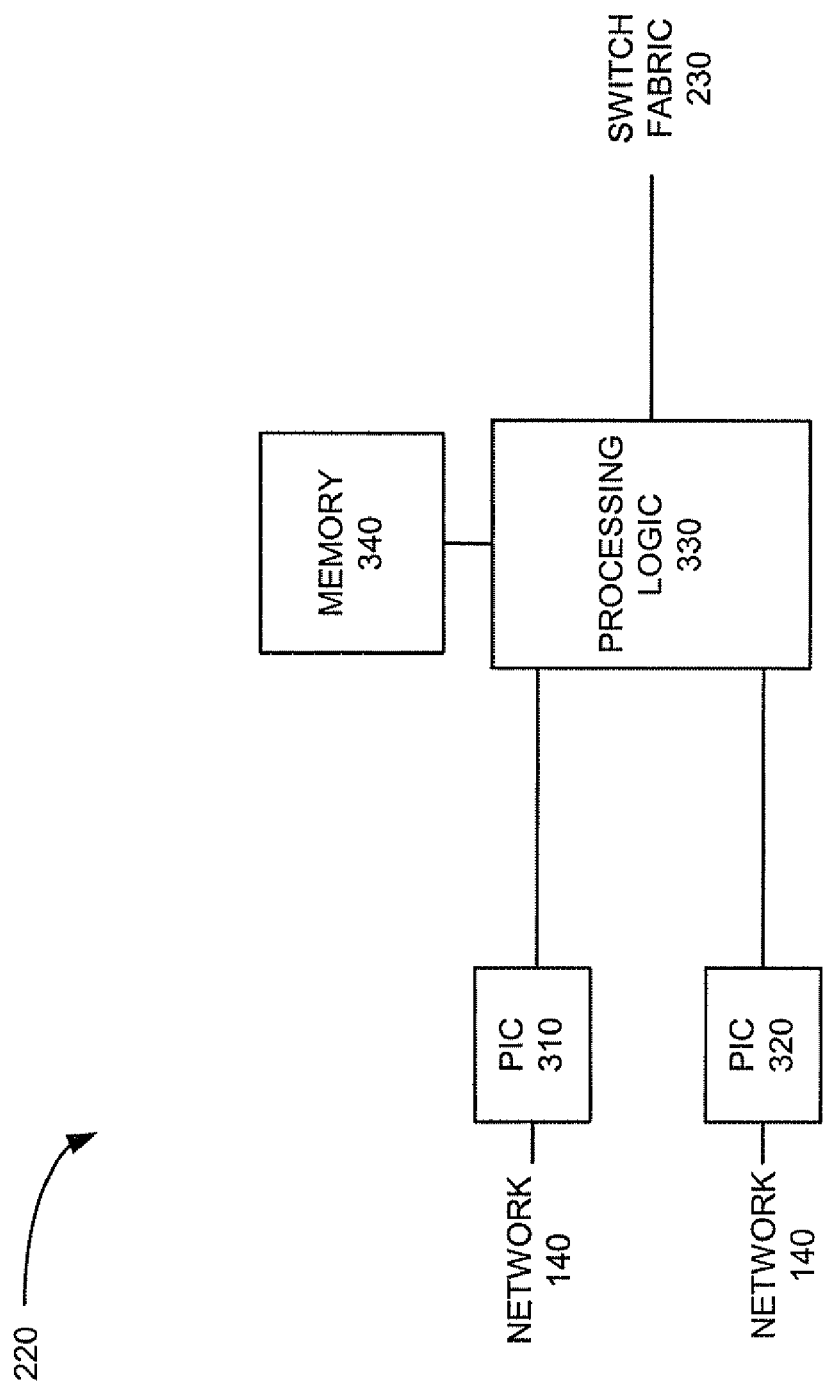
FIG. 3 is an exemplary block diagram of components implemented in the packet forwarding engines of FIG. 2.

FIG. 3 is an exemplary diagram of components implemented in one or more of PFEs 220 of FIG. 2. PFE 220 may include physical interface cards (PICs) 310 and 320, processing logic 330 and memory 340. The number of elements shown in FIG. 3 is provided for simplicity. It should be understood that additional devices, such as additional PICs, processing devices and memory elements may be included in PFE 220.

PICs 310 and 320 connect to network 140 (e.g., via physical links) and transport data between network 140 and processing logic 330. Each of PICs 310 and 320 includes interfacing, processing, and memory elements necessary to transmit data between network 140 and processing logic 330. In addition, in some implementations, each of PICs 310 and 320 may be designed to handle a particular type of physical link. For example, a particular PIC may be provided to handle only Ethernet communications. For incoming data, PICs 310 and 320 may strip off various information, such as layer 1 (L1) protocol information and/or protocol information associated with another layer, and forward the remaining data to processing logic 330. For outgoing data, PICs 310 and 320 may receive packets from processing logic 330, encapsulate the packets in, for example, L1 protocol information and/or protocol information associated with another layer, and transmit the data via network 140.

Processing logic 330 performs packet transfers between PICs 310 and 320 and switch fabric 230. For each packet it handles, processing logic 330 may perform route lookup based on packet header information to determine destination information and send the packet to the appropriate destination, which may be another interface on the PFE 220 itself (i.e., the ingress PFE 220) or to another PFE 220. In cases where the destination is associated with another PFE 220, processing logic 330 may forward the packet to switch fabric 230, which then forwards the packet to the destination PFE 220.

Processing logic 330 may also include various input/output logic for processing packet data from/to PICs 310 and 320. For example, for incoming data, processing logic 330 may break the packets into portions and store the portions in memory 340. For outgoing data, processing logic 330 may retrieve the portions of the data packets from memory 340 and forward the data via one or more of PICs 310 and 320.

Memory 340 may be implemented as one or more memory devices. Memory 340 may temporarily store data received from PICs 310 and 320. For example, as described briefly above, data received from PICs 310 and 320 may be broken up into portions and stored in memory 340.

Processing logic 330 may receive multicast packets that are to be forwarded to a number of destinations. In an exemplary implementation, processing logic 330 may perform data replication and data forwarding using a binary replication scheme that ensures that no PFE 220 performs more than two data replications for a given packet, as described in detail below.

For example, FIG. 4 illustrates instances of two binary trees 410 and 420 used by processing logic 330 when replicating data packets associated with a multicast group including a number of PFEs 220. In this example, assume that six PFEs 220 (referred to herein as PFEs 1-6) are part of a multicast group. That is, network device 120 may be pre-stored information indicating that PFEs 1-6 are part of a group of PFEs 220 that make up a multicast group in which an incoming data packet received by an ingress PFE 220 may be multicast to PFEs 1-6.

Binary trees 410 and 420 may be stored in processing logic 330, in memory 340 and/or may be implemented in hardware, software or a combination of hardware and software in each of PFEs 1-6. Binary trees 410 and 420 may each include a root node, branch nodes (also referred to as non-leaf nodes) and leaf nodes. The term "root node" as used herein with respect to binary trees 410 and 420 refers to a top node of the tree, which represents the ingress PFE 220 on which a packet was initially received from network 140. In binary trees 410 and 420, "X" represents the root node. The term "branch node" (or non-leaf node) as used herein with respect to binary trees 410 and 420 refers to a node that connects to a node at a higher level in the tree (such as node X in FIG. 4) and also connects to one or more nodes at a lower level of the tree. For example, nodes 1 and 2 in binary tree 410 represents branch nodes and nodes 6 and 5 in binary tree 420 represent branch nodes. The term "leaf node" as used herein refers to a node that connects to a node at a higher level in the tree, but does not connect or branch to any nodes at a lower level of the binary tree. For example, nodes 3, 4, 5 and 6 in binary tree 410 are leaf nodes and nodes 4, 3, 2 and 1 in binary tree 420 are leaf nodes.

Binary tree 410 may correspond to a sequential binary tree, where each of nodes 1-6 is provided in a sequential order. That is, the top two branch nodes under root node X are 1 and 2 and the leaf nodes below branch nodes 1 and 2 are 3, 4, 5 and 6. Binary tree 420 may represent a second instance of a binary tree, where each of nodes 1-6 is provided in a "reverse" sequential order. That is, the top branch nodes below root node X are 6 and 5 and the leaf nodes below branch nodes 6 and 5 are 4, 3, 2 and 1. Binary trees 410 and 420 are constructed such that at least one instance of binary tree 410 and 420 will include each element in the group as a leaf node. That is, each of the elements in the group (i.e., nodes 1-6) is a leaf node in at least one of binary trees 410 and 420. Processing logic 330 may select the binary tree in which the ingress PFE is a leaf node and perform data replication and forwarding in accordance with the selected binary tree.

For example, suppose that a data packet is received on PIC 310 of a PFE 220 that corresponds to PFE 2 and the processing logic 330 determines that the data packet is to be multicast to PFEs 1-6. In this case, processing logic 330 examines binary tree 410 and determines that PFE 2 is a branch node. Processing logic 330 also examines binary tree 420 and determines that PFE 2 is included as a leaf node. Therefore, in this example, processing logic 330 selects binary tree 420 as the instance of the binary tree to be used for data replication and forwarding purposes, as described in detail below. As further described below, selecting the appropriate instance of the binary tree in this manner ensures that no PFE will perform more than two data replications, thereby improving efficiency and reducing congestion on network device 120.

To briefly prove that one of the instances of the binary trees 410 or 420 will always include one of the members of the group as a leaf node, suppose the L corresponds to a leaf node, NL to a non-leaf node, num(L) to the number of leaf nodes and num (NL) to the number of non-leaf nodes. In this case, the total number of nodes is equal to num(L)+num (NL). In addition, a property of each binary tree 410 and 420 is that num(L) is greater than or equal to num (NL). Now consider the two binary trees 410 and 420 (one constructed with a list of items 1, 2, 3, 4, 5 and 6 and the other constructed with a "reversed" list of items 6, 5, 4, 3, 2 and 1).

If num (L)=num(NL), then one item would be a leaf node in both trees. For the rest of the items, the leaf nodes in the first tree would be non-leaf nodes in the second tree (i.e., the reverse tree) and vice versa. If num(L)>num(NL), then at least some of the leaf nodes in the first tree would be non-leaf nodes in the second tree (i.e., the reverse tree) and vice versa. Therefore, using two instances of the binary tree 410 and 420 in this manner ensures that each of the items in the group will always be a leaf node. It should be noted that for binary trees 410 and 420, the root node is not counted as a non-leaf node since the root node is undecided apriori. In this implementation, num (L) is always greater than num (NL) and as discussed above, in such a case, each of the items in the group will be included as a leaf node in at least one of trees 410 and 420.

Exemplary Processing

Figure 5:
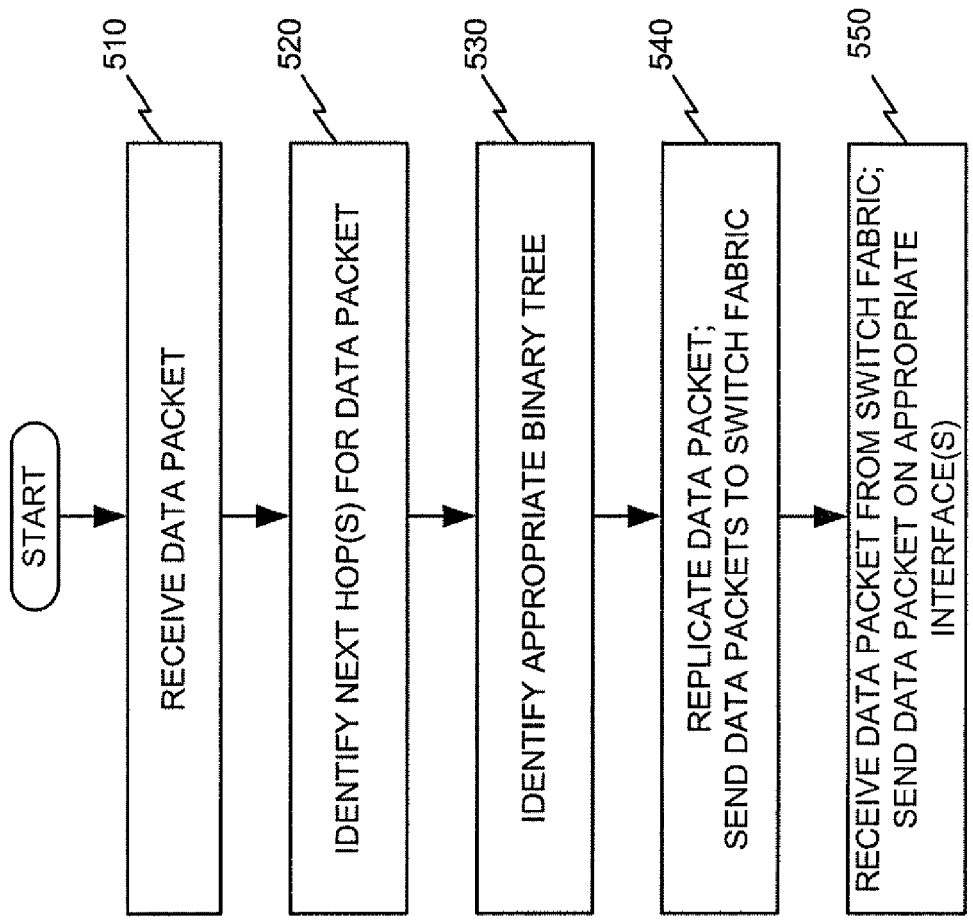
FIG. 5 is a flow diagram illustrating exemplary processing associated with processing multicast traffic.

FIG. 5 is a flow diagram illustrating exemplary processing associated with processing multicast data. Processing may begin with PIC 310 on one of PFEs 220 receiving a data packet from network 140 (act 510). Assume that the ingress PFE corresponds to PFE 1. Processing logic 330 may store the data packet in memory 340 while processing information associated with identifying a next hop(s) for the data packet.

For example, processing logic 330 may process information in the header of the data packet and identify the next hop for the data packet (act 520). If the data packet is a unicast packet, processing logic 330 may forward the data packet to an output interface associated with the next hop. The next hop may be associated with another PIC on PFE 220, such as PIC 320. Alternatively, the next hop may be associated with another PFE 220. In this case, processing logic 330 may forward the data packet to switch fabric 230, which then forwards the data packet to the appropriate PFE 220.

Assume, however, that processing logic 330 determines that the data packet is a multicast packet to be forwarded to a number of output interfaces associated with other PFEs 220, such as multicast group associated with PFEs 1 through PFE 6. In this case, processing logic 330 may identify the appropriate binary tree to use for purposes of packet replication and forwarding (act 530). That is, processing logic 330 may identify whether binary tree 410 or binary tree 420 includes the ingress PFE as a leaf node. Referring to FIG. 4, binary tree 410 includes node 1 (i.e., PFE-1) as a branch node. Therefore, binary tree 410 may not be used. Binary tree 420, however, includes node 1 as a leaf node. Therefore, in this example, processing logic 330 identifies binary tree 420 as the appropriate binary tree to use for data packet replication and forwarding purposes.

Processing logic 330 may then replicate the data packet based on binary tree 420 (act 540). That is, ingress PFE-1 represents the root node X in binary tree 420. Processing logic 330 may then replicate the data packet for sending to PFEs 6 and 5, as illustrated by the top branches of binary tree 420 branching from root node X. In some instances, processing logic 330 may generate two copies of the received data packet for forwarding to PFEs 6 and 5. In other instances, processing logic 330 may make one copy of the received data packet and send the copy along with the originally received data packet. In either case, processing logic 330 may then send the data packets intended for PFEs 6 and 5 to switch fabric 230 (act 540). The replicated data packets may include information identifying PFEs 6 and 5 may also include a token or a tag indicating the particular binary tree forwarding scheme to be used (i.e., binary tree 410 or binary tree 420) for the receiving PFEs to use when performing further data replication. In this case, the token identifies binary tree 420 as the appropriate binary tree for data replication and forwarding purposes.

Switch fabric 230 may forward the data packets to PFE-6 and PFE-5. The receiving PFE 6 and PFE 5 receive the data packets and identify the forwarding scheme to be used for forwarding the data packet (act 550). In this example, PFEs 6 and 5 identify binary tree 420 based on the token or tag included in the received data packet. PFE-6 may then replicate the data packet for forwarding to PFE 4 and PFE 3 based on branch node 6 in binary tree 420 branching to leaf nodes 4 and 3. PFE 5 may replicate the data packet for forwarding to PFEs 2 and 1 based on branch node 5 in binary tree 420 branching to leaf nodes 2 and 1. PFEs 6 and 5 may then send the replicated data packets to switch fabric 230 for forwarding to the destination PFEs. PFEs 6 and 5 may also send the received data packet (e.g., the multicast packet) to network 140 on the appropriate interface(s) associated with the multicast group (act 550). That is, PFEs 6 and 5 are also egress PFEs in the multicast group.

Switch fabric 230 may receive the replicated packets from PFEs 6 and 5 and forwards the replicated data packets to PFEs 4, 3, 2 and 1. Each of the PFEs 4, 3, 2 and 1 receives the replicated data packet and forwards the data packet to network 140 via the interface(s) associated with the multicast group (act 550). For example, PFE 1 may forward the multicast packet via an interface associated with PIC 320.

In this example, none of PFEs 1 through 6 performed more than two data replications associated with the multicast packet. In this manner, constructing the binary trees 410 and 420 and selecting the appropriate one of binary trees 410 or 420 in which the ingress PFE is a leaf node ensures that no PFE in the multicast group will perform more than two data packet replications. This reduces processing resources needed on each PFE associated with performing data packet replication. That is, the processing associated with replicating the data packets may be distributed over a number of PFEs, as opposed to being concentrated in one PFE 220.

In addition, since no PFE 220 in network device 120 performs more than two data packet replications, no PFE 220 forwards more than two times the line rate of data received to switch fabric 230. That is, in this example, none of PFEs 1 through 6 sent more than two copies of the data packet to switch fabric 230. This enables network device 120 to maintain good data throughput. For example, if the incoming line rate on a PFE is B, the multicasting scheme described above enables network device 120 to maintain a line rate of B/2 for multicast traffic. This is in contrast to conventional systems that may perform four or more data packet replications which result in reducing the line rate to B/4 or less.

As an example, suppose that only a single forwarding scheme was used to perform data replication, such as a scheme similar to that illustrated by binary tree 410. In this case, if PFE 1 is the ingress PFE in binary tree 410, PFE 1 replicates the packet twice for forwarding to PFE 1 (itself) and PFE 2. PFE 1 then forwards the two data packets to switch fabric 230. The receiving PFEs (i.e., PFEs 1 and 2) receive the packet. PFE 1 then replicates the data packet for forwarding to PFEs 3 and 4 and PFE 2 replicates the data packet for forwarding to PFEs 5 and 6. PFEs 1 and 2 then forward the replicated data packets to switch fabric 230. In this example, PFE 1 replicated the packet four times and sent four copies of the data packet to switch fabric 230. This is in contrast to the example illustrated above in FIG. 5 in which none of the PFEs 220, including the ingress PFE (i.e., PFE 1) performed more than two data packet replications and none of PFEs 220 forwarded more than two copies of the packet to switch fabric 230. Therefore, in conventional systems, each PFE 220 may disadvantageously perform significantly more processing and the line rate may be reduced by a factor of four or more.

Therefore, in the manner discussed above, using two instances of a binary tree (i.e., binary trees 410 and 420) and selecting the appropriate binary tree ensures that no PFE 220 will perform more than two data packet replications for a given multicast packet, thereby reducing congestion and maintaining a high line rate or throughput. This also helps reduce memory constraints on PFEs 220 with respect to processing multicast packets.

In some instances, both of binary trees 410 and 420 may include the ingress node as a leaf node, such as PFE-3 and PFE-4 in FIG. 4. In this case, processing logic 330 may be configured to identify the first instance (i.e., binary tree 410) as the default tree to use for processing multicast traffic. Other factors may also be used to select which particular one of binary trees 410 and 420 to use.

In addition, in the examples above, the ingress PFE was described as also being one of the other nodes in the tree (i.e., a branch node or leaf node). In other words, in the examples above, the ingress PFE was also part of the multicast group. In other instances, an ingress PFE may not be part of the multicast group to which the packet is to be forwarded. For example, the ingress PFE for the example given above with respect to FIG. 4 may be PFE 10. In this case, either one of binary trees 410 or 420 may be used for processing the multicast packet. Therefore, if an ingress PFE is not also part of the multicast group, no node in either of the trees (i.e., binary trees 410 and 420) will perform more than two data packet replications.

Further, in the examples provided above, the multicast group included PFEs incrementally numbered 1 through 6 for simplicity. It should be understood that the PFEs in a multicast group could include any group of PFEs based on the particular network. For example, a multicast group may include PFEs 1, 3, 5, 8, 10, 11. Another multicast group may include PFEs 1, 2, 5, 9, 10, 12. In other words, any particular PFEs may be included in a multicast group and this information may be stored in processing logic 330 and/or memory 340 of each of the PFEs. In each case, two instances of a binary tree associated with each multicast group may be stored in processing logic 330 and/or memory 340 to ensure that none of the PFEs in the multicast groups perform more than two data packet replications when multicasting a received data packet.

In addition, in some implementations, processing logic 330 of each of PFEs may randomize the instances of binary trees 410 and 420 illustrated in FIG. 4. For example, as illustrated in FIG. 4, assume that a multicast group includes PFEs 1 through 6. In binary tree 410, the ingress node X that receives the incoming packet that is to be multicast forwards the packet to nodes 1 and 2, which then perform the packet replication for forwarding the packets to nodes 3 and 4, and 5 and 6, respectively. Therefore, when binary tree 410 is selected as the appropriate binary tree to use, this means that PFEs 1 and 2 may perform more processing than other PFEs, such as the PFEs corresponding to leaf nodes 3, 4, 5 and 6 in binary tree 410. Therefore, in some implementations, processing logic 330 may randomize or rotate which nodes in binary tree 410 may be branch nodes and which nodes may be branch nodes or leaf nodes to balance the processing load on the various PFEs.

For example, processing logic 330 may rotate or randomize which node will be the staring node in the sequence of PFEs 1, 2, 3, 4, 5, and 6. As an example, FIG. 6 illustrates binary trees 610 and 620 which correspond to modified versions of binary trees 410 and 420 in which the starting node in the forwarding scheme has changed from node 1 in binary tree 410 to node 3 in binary tree 610. That is, the sequential ordering of the nodes 1, 2, 3, 4, 5, 6 illustrated in binary tree 410 has been changed to 3, 4, 5, 6, 1 and 2, as illustrated in binary tree 610. Referring to FIG. 6, binary tree 610 includes root node X (corresponding to the ingress PFE) coupled to branches nodes 3 and 4, with branch node 3 coupled to leaf nodes 5 and 6 and branch node 4 coupled to leaf nodes 1 and 2.

Binary tree 620 may be constructed in reverse sequential order as binary tree 610. That is, the sequence 3, 4, 5, 6, 1, 2 is reversed to 2, 1, 6, 5, 4, 3. Therefore, binary tree 620 includes root node X coupled to branch nodes 2 and 1, with branch node 2 coupled to leaf nodes 6 and 5 and branch node 1 coupled to leaf nodes 4 and 3. Similar to the discussion above with respect to FIG. 4, constructing two instances of a binary tree in this manner ensures that one instance of binary tree 610 and 620 will include each element in the multicast group as a leaf node.

For example, referring to FIG. 6, each of nodes 1, 2, 3, 4, 5 and 6 is included in a leaf node in at least one of binary trees 610 and 620. This ensures that no PFE will perform more than two data packet replications for the multicast packet. In addition, by rotating or randomizing which node is the starting node in the tree helps further balance the processing load on the PFEs. For example, using binary tree 410, PFEs 1 and 2 perform data replication of the received data packet. In contrast, in binary tree 610, PFEs 1 and 2 are leaf nodes and perform no additional data packet replication for forwarding the received packet to other PFEs. Processing logic 330 may keep track of the starting node for each multicast group and may increment the starting node for each subsequent instance of multicasting traffic to that multicast group or may perform a simple randomization process so that the starting node is randomly selected each time a multicast packet is received. In each case, changing a starting node in instances of the binary trees may further balance the processing load among the PFEs in a multicast group. This further helps memory constraint issues with respect to processing multicast packets.

Conclusion

Systems and methods described herein provide for efficiently processing multicast data. Advantageously, the data replication process may be distributed over a number of devices in a manner than ensures that no device performs all of the data replication related processing. In addition, the forwarding scheme enables the network device to maintain a high data throughput, thereby reducing network congestion.

The foregoing description of preferred embodiments provides illustration and description, but is not intended to be exhaustive or to limit the invention to the precise form disclosed. Modifications and variations are possible in light of the above teachings or may be acquired from practice of the invention. For example, while series of acts have been described in relation to FIG. 5, the order of the acts may be varied in other implementations consistent with the invention. Moreover, non-dependent acts may be performed in parallel.

In addition, while aspects have been described above with respect to a network device, such as a router, performing various processing, aspects described herein may have applicability in other devices, such as switches or other devices, where multicasting may be required. Further, while processing has been described as being performed by particular components of network device 120, it should be understood that the processing described as being performed by one component may be performed by other components in alternative implementations.

It will also be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects of the invention were described without reference to the specific software code—it being understood that one of ordinary skill in the art would be able to design software and control hardware to implement the aspects based on the description herein.

Further, certain portions of the invention may be implemented as "logic" that performs one or more functions. This logic may include hardware, such as an application specific integrated circuit, a field programmable gate array, a processor and/or a microprocessor, software, or a combination of hardware and software, such as a processor/microprocessor executing instructions stored in a memory.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The scope of the invention is defined by the claims and their equivalents.

What is claimed is:

1. A network device, comprising:
   a switch fabric; and
   a plurality of packet forwarding devices connected via the switch fabric, each of the plurality of packet forwarding devices comprising:
   logic to:
      receive a first data packet,
      determine that the first data packet is to be forwarded to more than one of the plurality of packet forwarding devices,
      identify one of a plurality of binary forwarding schemes, each of the plurality of binary forwarding schemes representing the plurality of packet forwarding devices to which the first data packet is to be forwarded as nodes in a tree, the nodes comprising a root node, branch nodes and at least one leaf node, where an ingress packet forwarding device, of the plurality of packet forwarding device, that received the first data packet corresponds to the root node, where when identifying the one of a plurality of binary forwarding schemes, the logic is to identify a first binary forwarding scheme in which none of the plurality of packet forwarding devices forwards more than two copies of the first data packet to the switch fabric,
      forward the copies of the first data packet to the switch fabric
   where the plurality of binary forwarding schemes comprises two binary forwarding schemes, and
   where the branch nodes and the at least one leaf node associated with the tree in a first one of the two binary forwarding schemes are ordered in a sequential order and where the branch nodes and the at least one leaf node associated with the tree in a second one of the two binary forwarding schemes are ordered in a reverse sequential order with respect to the sequential order of the first binary forwarding scheme.

2. The network device of claim 1, where when identifying one of a plurality of binary forwarding schemes, the logic is to identify a first binary forwarding scheme in which the ingress packet forwarding device is a leaf node.

3. The network device of claim 1, where when identifying one of a plurality of binary forwarding schemes, the logic is to identify a first binary forwarding scheme in which none of the plurality of packet forwarding devices forwards more than two copies of the first data packet to the switch fabric.

4. The network device of claim 1, where the logic is further to:
change a starting branch node in the sequential order of the first binary forwarding scheme when processing data packets to be multicast to a multicast group, and
change a starting branch node in the reverse sequential order of the second binary forwarding scheme based on the change to the starting branch node in the sequential order of the first binary forwarding scheme.

5. The network device of claim 1, where the switch fabric is to receive two copies of the first data packet and forward the two copies of the first data packet to two of the plurality of packet forwarding devices.

6. The network device of claim 5, where the logic is further to insert information identifying the one of the plurality of binary forwarding schemes in the two copies of the first data packet.

7. The method of claim 1, where each of the plurality of packet forwarding devices further comprises:
a memory to store information associated with two binary forwarding schemes.

8. A method for processing multicast data in a network device comprising a plurality of packet forwarding engines connected via a switch fabric, the method comprising:
receiving a data packet at a first one of the packet forwarding engines;
determining that the data packet is to be multicast;
identifying a first one of a plurality of forwarding schemes;
copying, based on the first forwarding scheme, the data packet for forwarding to other ones of the packet forwarding engines via the switch fabric; and
forwarding copies of the data packet to the switch fabric, where none of the plurality of packet forwarding engines forwards more than two copies of the data packet to the switch fabric,
where each of the plurality of forwarding schemes comprises a binary forwarding scheme, each of the binary forwarding schemes representing the packet forwarding engines, to which the data packet is to be forwarded, as nodes in a tree, the nodes comprising a root node, branch nodes and at least one leaf node, where the first packet forwarding engine corresponds to the root node, and
where the branch nodes and the at least one leaf node associated with the tree in the first forwarding scheme are ordered in a sequential order and where the branch nodes and the at least one leaf node associated with the tree in a second one of the plurality of forwarding schemes are ordered in a reverse sequential order with respect to the sequential order of the first forwarding scheme.

9. The method of claim 8, further comprising:
forwarding, by the switch fabric, the copies of the data packet to multiple ones of the plurality of packet forwarding engines.

10. The method of claim 8, where the identifying a first one of a plurality of forwarding schemes comprises identifying a first binary forwarding scheme in which the first packet forwarding engine is a leaf node.

11. The method of claim 10, further comprising:
forwarding the copies of the data packet to the switch fabric in accordance with the first binary forwarding scheme.

12. The method of claim 11, further comprising:
receiving, at a second one of the packet forwarding engines, one of the copies of the data packet;
identifying, by the second packet forwarding engine, the first binary forwarding scheme; and
copying, by the second packet forwarding engine, the received one of the copies of the packet in accordance with the first binary forwarding scheme.

13. The method of claim 8, further comprising:
changing a starting node in the sequential order associated with the first forwarding scheme in a random or predetermined manner each time a multicast packet is to be forwarded to a same multicast group.

14. The method of claim 8, further comprising:
inserting information identifying the first forwarding scheme in the copies of the data packet forwarded to the switch fabric.

15. A system, comprising:
means for receiving a data packet at a first one of a plurality of packet forwarding devices;
means for determining that the data packet is to be multicast;
means for identifying a first one of two forwarding schemes;
means for copying, based on the first forwarding scheme, the data packet for forwarding to other ones of the packet forwarding devices via a switching device;
means for forwarding copies of the data packet to the switching device;
means for storing information representing the two forwarding schemes, each of the two forwarding schemes comprising a binary forwarding scheme where the first packet forwarding device is represented as a root node in a tree and other ones of the packet forwarding devices to which the data packet is to be forwarded are represented as branch nodes and/or leaf nodes in the tree,
where the branch nodes and/or the leaf nodes associated with the tree in the first forwarding scheme are ordered in a sequential order, and where the branch nodes and/or the leaf nodes associated with the tree in a second one of the two forwarding schemes are ordered in a reverse sequential order with respect to the sequential order of the first forwarding scheme.

16. The system of claim 15, where the means for identifying a first forwarding scheme comprises:
means for identifying one of the two forwarding schemes in which the first packet forwarding device is represented as a leaf node.

17. A network device, comprising:
an input device to receive a data packet;
a first packet forwarding engine comprising:
logic to:
determine that the data packet is to be multicast,
identify a first one of a plurality of forwarding schemes, where, in each of the plurality of forwarding schemes, the first packet forwarding engine generates and forwards no more than two copies of the data packet,
generate at least one copy of the data packet in accordance with the first forwarding scheme, and forward the at least one copy of the data packet; and a memory to store information representing two of the plurality of forwarding schemes, each of the two forwarding schemes comprising a binary forwarding scheme, where the first packet forwarding engine is represented as a root node in a tree and other packet forwarding engines to which the data packet is to be forwarded are represented as branch nodes and/or leaf nodes in the tree, where the branch nodes and/or the leaf nodes associated with the tree in the first forwarding scheme are ordered in a sequential order, and where the branch nodes and/or the leaf nodes associated with the tree in a second one of the two forwarding schemes are ordered in a reverse sequential order with respect to the sequential order of the first forwarding scheme.

18. The network device of claim 17, where when identifying the first forwarding scheme, the logic is to:

identify one of the two forwarding schemes in which the first packet forwarding device is represented as a leaf node.

19. The network device of claim 17, where when forwarding the at least one copy, the logic is to forward a first copy of the data packet along with the received data packet or forward two copies of the data packet.

* * * * *